(12) United States Patent
Suzuki

(10) Patent No.: US 11,565,810 B2
(45) Date of Patent: Jan. 31, 2023

(54) FLYING BODY

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 266 days.

(21) Appl. No.: 16/754,230

(22) PCT Filed: Oct. 10, 2017

(86) PCT No.: PCT/JP2017/036673
§ 371 (c)(1),
(2) Date: Apr. 7, 2020

(87) PCT Pub. No.: WO2019/073520
PCT Pub. Date: Apr. 18, 2019

(65) Prior Publication Data
US 2020/0277055 A1  Sep. 3, 2020

(51) Int. Cl.
*B64C 39/00* (2006.01)
*B64C 39/02* (2006.01)
*B64D 47/08* (2006.01)

(52) U.S. Cl.
CPC ............ *B64C 39/024* (2013.01); *B64D 47/08* (2013.01); *B64C 2201/027* (2013.01);
(Continued)

(58) Field of Classification Search
CPC ............ B64C 39/024; B64C 2201/027; B64C 2201/042; B64C 2201/108;
(Continued)

(56) References Cited

U.S. PATENT DOCUMENTS 5,758,844 A   6/1998  Cummings
6,592,073 B1  7/2003  Meekins
(Continued)

FOREIGN PATENT DOCUMENTS

CN  205327401 U   6/2016
JP  2016219941 A  12/2016
JP  2017015697 A   1/2017

OTHER PUBLICATIONS

Notice of Reasons for Refusal dated Aug. 26, 2021 for related Japanese Patent Application No. 2018-129301.
(Continued)

*Primary Examiner* — Christopher Verdier
*Assistant Examiner* — Maxime M Adjagbe

(57) ABSTRACT

[Problem] To provide a flying body having a new structure capable of improving flight efficiency. [Solution] The problem is addressed by a flying body capable of traveling along at least a first direction and comprising an airframe part and an auxiliary part wherein the airframe part has a body part and a lift generating part, the body part having a right part and a left part extending along the first direction and a connecting part whereby the ends of the right part and the left part in a second direction opposing to the first direction are connected. The flying body is thus configured so as to create a surrounded space surrounded by the left part, the right part, and the connecting part when seen from a third direction perpendicular to the first direction.

9 Claims, 8 Drawing Sheets

(52) U.S. Cl.
CPC .. *B64C 2201/108* (2013.01); *B64C 2201/127* (2013.01); *B64C 2201/14* (2013.01)

(58) Field of Classification Search
CPC ........ B64C 2201/127; B64C 2201/146; B64C 2201/165
See application file for complete search history.

(56) References Cited

U.S. PATENT DOCUMENTS

| | | | |
|---|---|---|---|
| 9,561,852 | B1 | 2/2017 | Beaman et al. |
| 10,870,479 | B2* | 12/2020 | Courtin ................. B64C 39/024 |
| 2009/0008499 | A1* | 1/2009 | Shaw ...................... B64C 27/20 |
| | | | 244/17.23 |
| 2014/0124613 | A1 | 5/2014 | Yang |
| 2016/0101856 | A1 | 4/2016 | Kohstall |
| 2016/0176520 | A1* | 6/2016 | Goldstein ............. B64C 39/024 |
| | | | 244/17.23 |
| 2016/0311526 | A1 | 10/2016 | Geise et al. |
| 2016/0376004 | A1* | 12/2016 | Claridge ............... B64C 39/024 |
| | | | 701/3 |
| 2017/0283050 | A1 | 10/2017 | Baek et al. |

OTHER PUBLICATIONS

International Search Report dated Dec. 19, 2017 for PCT Application No. PCT/JP2017/036673.
Japanese Office Action dated May 29, 2020 for related Japanese Patent Application No. 2020-074451.
Japanese Office Action dated Jul. 9, 2020 for related Japanese Patent Application No. 2020-074451.

* cited by examiner

[FIG. 1]
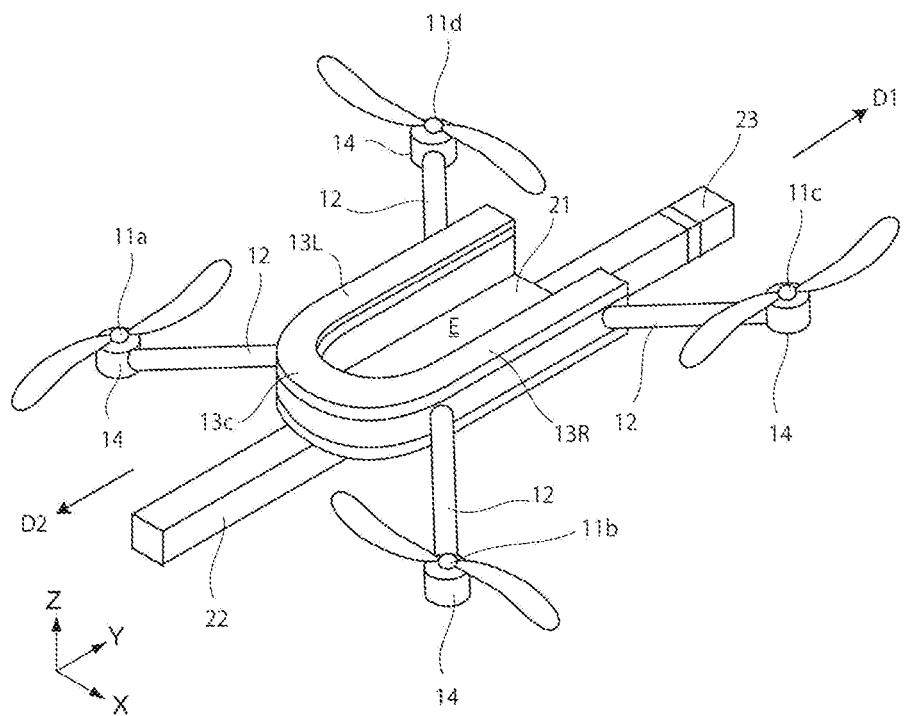

[FIG. 2]
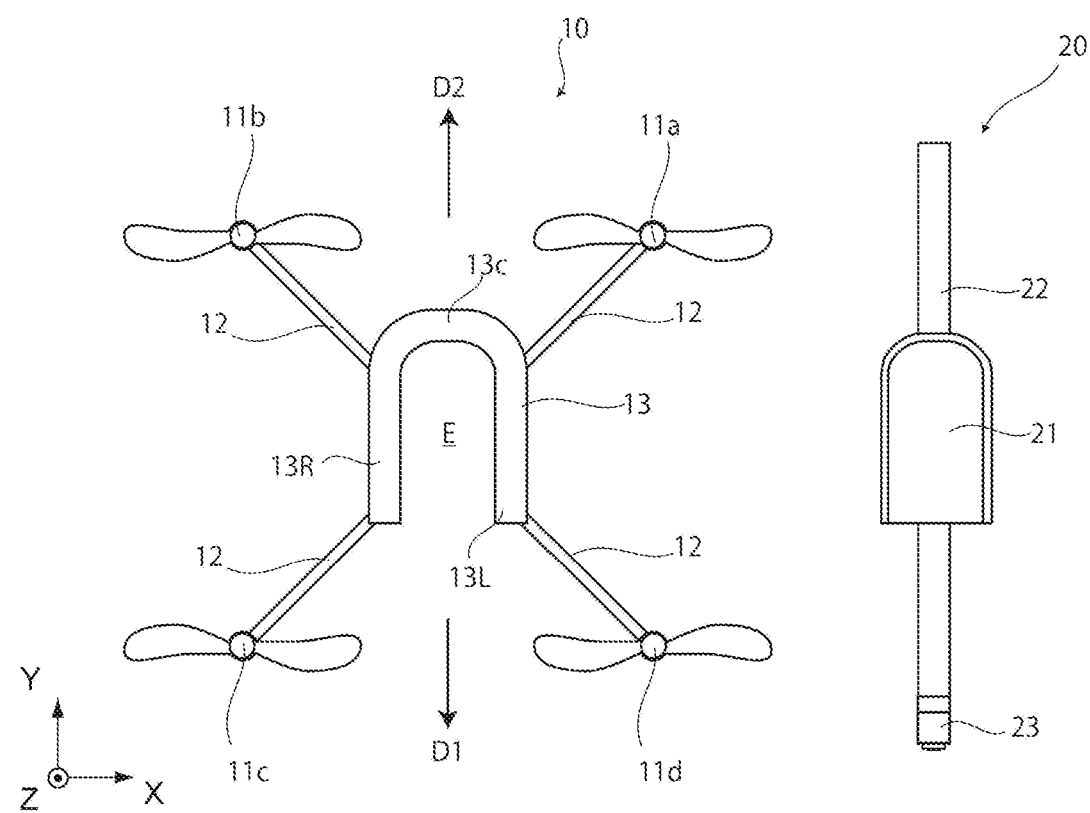

[FIG. 3]
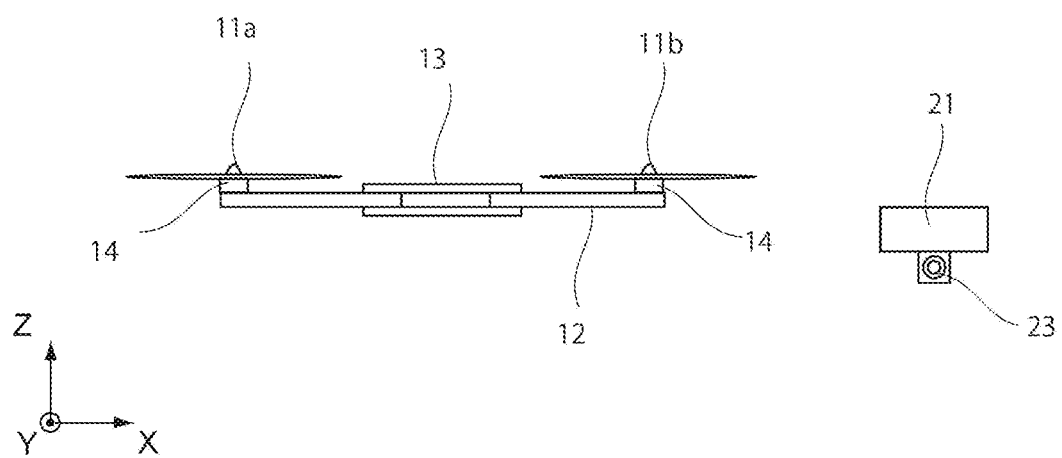

[FIG. 4]
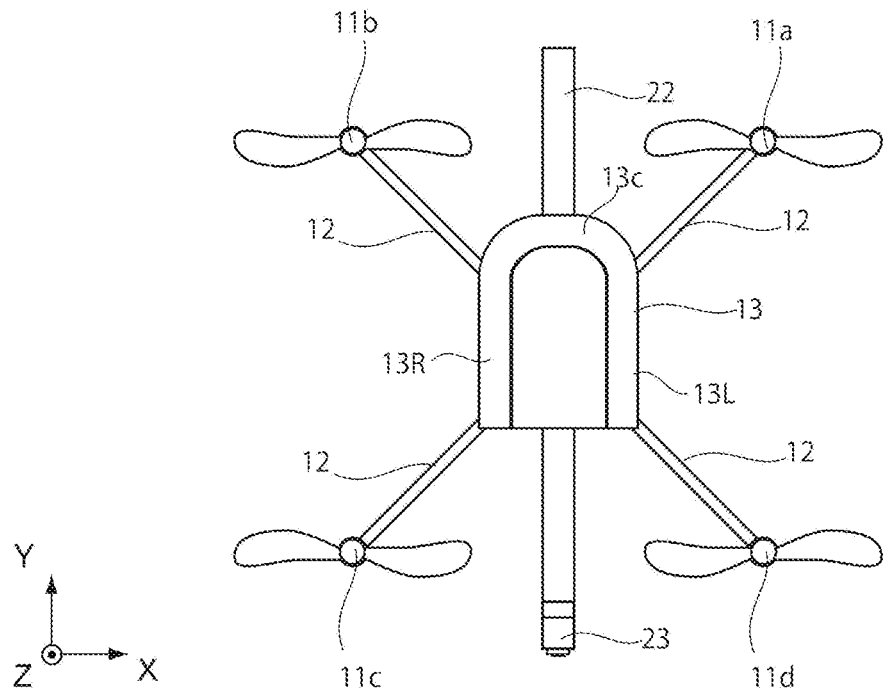
[FIG. 5]
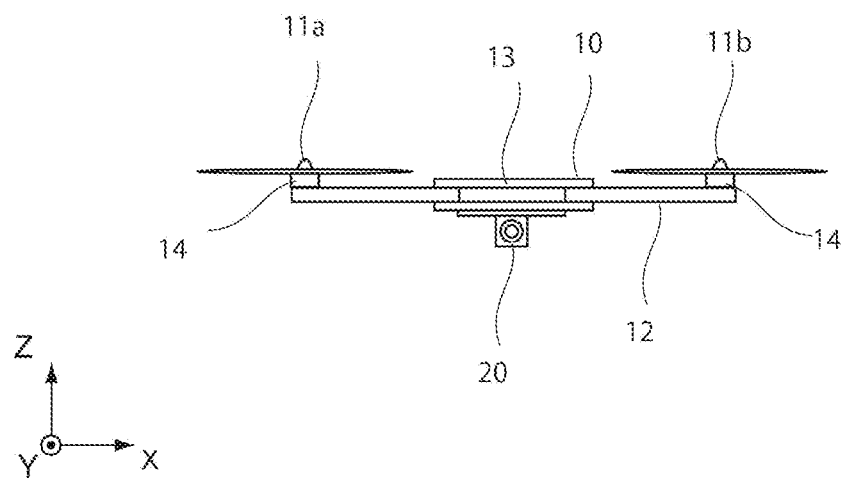

[FIG. 6]
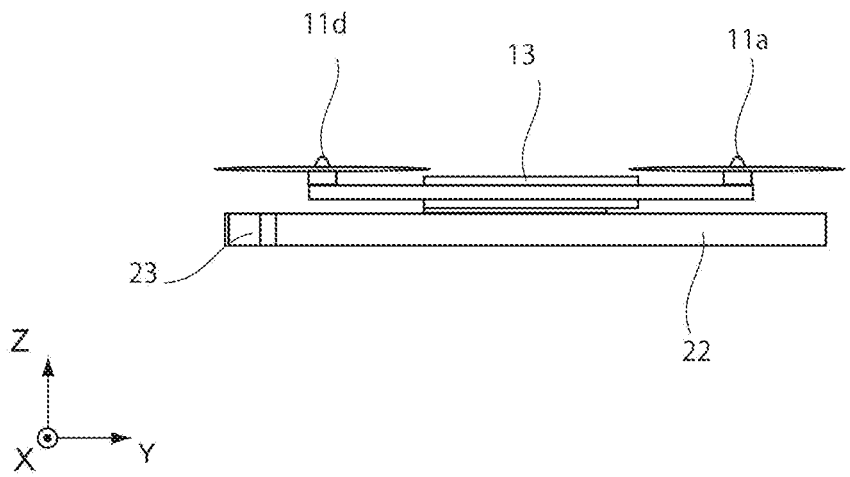
[FIG. 7]
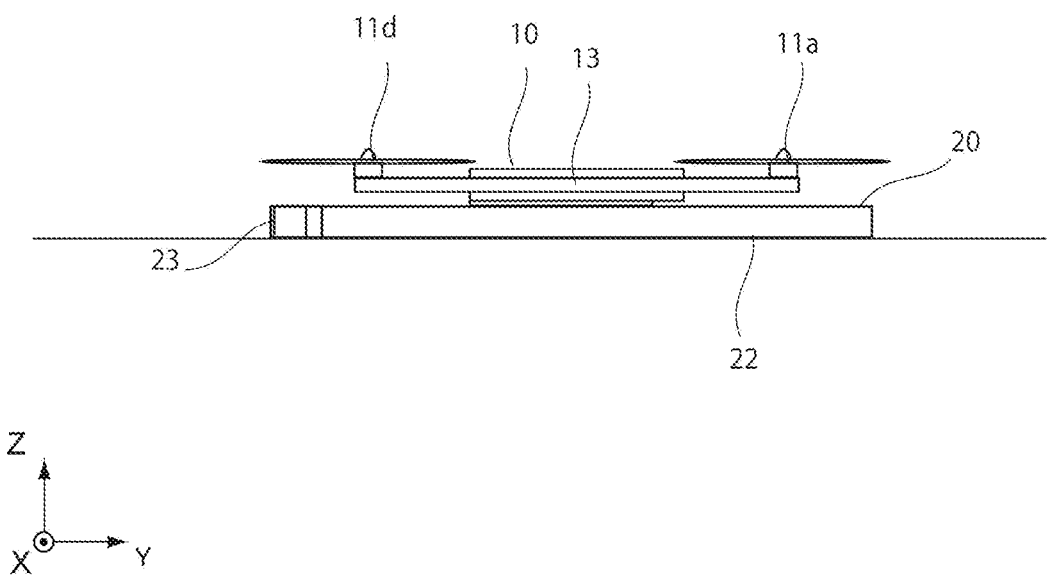

[FIG. 8]
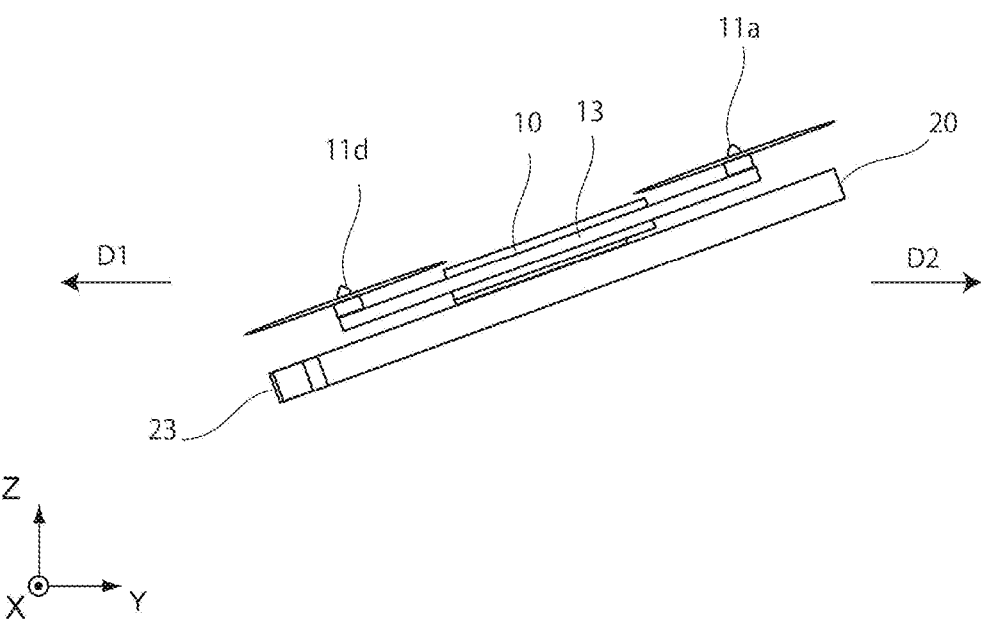

[FIG. 10]
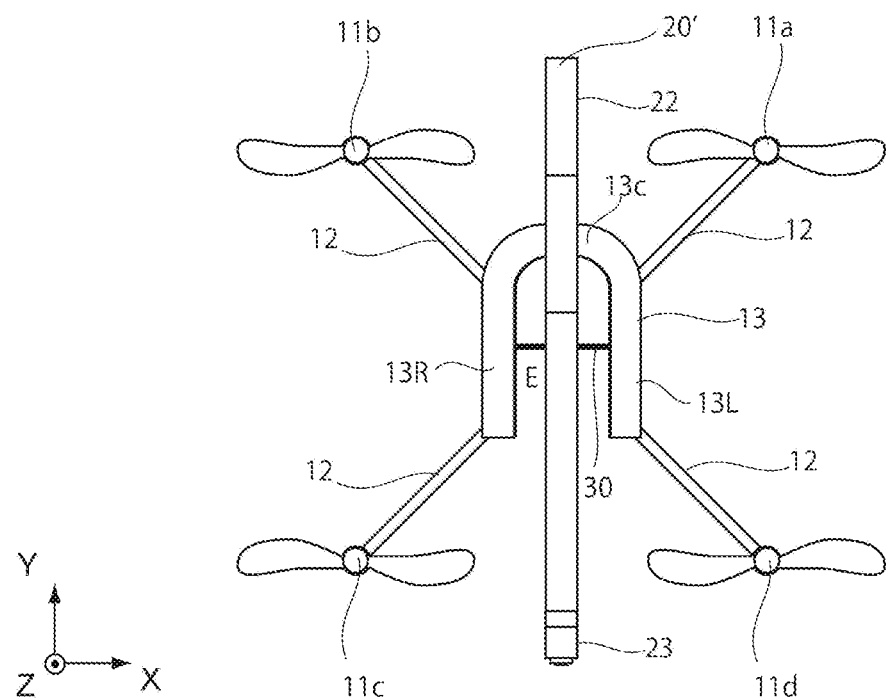

FLYING BODY

CROSS-REFERENCE TO RELATED APPLICATIONS

The present application is a National Stage of International Application No. PCT/JP2017/036673, filed on Oct. 10, 2017, the disclosure of which is incorporated herein by reference in its entirety.

TECHNICAL FIELD

The present disclosure relates to a flying body.

BACKGROUND ART

In recent years, various services have been provided using a flying body such as a drone or unmanned aerial vehicle (UAV) (hereinafter simply referred to as "flying body") used for various purposes (for example, refer to Patent Document 1).

PRIOR ART

Patent Document 1: Japanese Unexamined Patent Application Publication No. 2017-15697

DESCRIPTION OF THE INVENTION

Technical Problem

The present disclosure is directed to provide a flying body having a new structure capable of improving flight efficiency.

Technical Solution

According to the present invention, a flying bod capable of traveling along at least a first direction is provided, comprising an airframe part and an auxiliary part, wherein the airframe part has a body part and a lift generating part, and wherein the body part has a right part and a left part extending along the first direction and a connecting part whereby the ends of the right part and the left part are connected in a second direction opposing to the first direction, and thus a surrounded space which is surrounded by the left part, the right part, and the connecting part is created when seen from a third direction perpendicular to the first direction.

Advantageous Effects

According to the present disclosure, it is possible to provide a flying body capable of improving flight efficiency.

BRIEF DESCRIPTION OF THE DRAWINGS

FIG. 1 is a perspective view of a flying body according to the present disclosure.
FIG. 2 is an exploded view of FIG. 1.
FIG. 3 is a view of the exploded view of FIG. 2 viewed from the front.
FIG. 4 is a plan view of the flying body of FIG. 1.
FIG. 5 is a front view of the flying body of FIG. 1.
FIG. 6 is a side view of the flying body of FIG. 1.
FIG. 7 is another diagram illustrating a state at the time of landing (takeoff) of the flying body of FIG. 1.
FIG. 8 is another diagram illustrating a state at the time of moving forward of the flying body of FIG. 1.
FIG. 10 is a plan view of the flying body.

DETAILED DESCRIPTION OF THE INVENTION

Figure 9A:
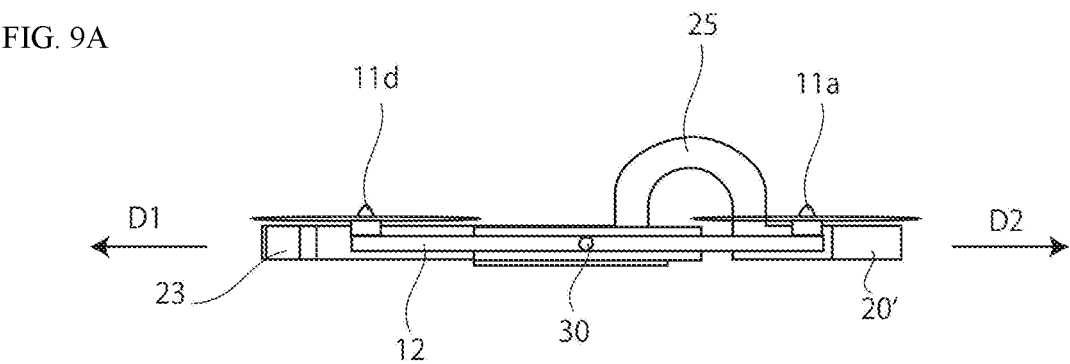
FIGS. 9A, 9B, and 9C are side views of a flying body according to a second embodiment of the present disclosure.

The contents of the embodiment of the present disclosure will be listed and described. A flying body according to an embodiment of the present disclosure has the following configuration.

[Item 1]
A flying body capable of traveling along at least a first direction, comprising an airframe part and an auxiliary part,
wherein the airframe part has a body part and a lift generating part, and
wherein the body part has a right part and a left part extending along the first direction and a connecting part whereby the ends of the right part and the left part are connected in a second direction opposing to the first direction, and thus a surrounded space which is surrounded by the left part, the right part, and the connecting part is created when seen from a third direction perpendicular to the first direction.

[Item 2]
The flying body as set forth in Item 1,
wherein the body part has a substantially C-shape, a substantially U-shape or a substantially channel-shape when viewed from the third direction.

[Item 3]
The flying body as set forth in Item 1 or Item 2,
wherein the auxiliary part is mounted to an attachment side surface of the surrounded space side on each of the right part and the left part of the body part.

[Item 4]
The flying body as set forth in Item 3,
wherein the auxiliary part has a long side in the first direction,
wherein the body part holds the auxiliary part rotatably along a plane defined by the first direction and the third direction.

[Item 5]
The flying body as set forth in Item 4,
wherein the auxiliary part includes a substantially arch-shaped relief part provided so as to straddle the connecting part.

First Embodiment

Hereinafter, the flying body according to the first embodiment of the present disclosure will be described with reference to the accompanying drawings. As shown in FIGS. 1 and 2, the flying body according to the present disclosure can move forward in a forward direction D1 (first direction: +Y direction), and can move in a backward direction D2 (second direction: −Y direction). Further, it can rise in an upward direction (third direction: +Z direction) and can descend in al direction (−Z direction).

As shown in detail in FIG. 2, the flying body is a combination of the airframe part 10 and the auxiliary part 20. In addition, other elements can be included as needed.

The airframe part 10 includes a body part 13 and a lift generating part (described thereafter), The body part 13 has a U-shape. The lift generating part includes arms 12 extending from the body part 13, a motor 14 mounted to each of the front ends of the arms, and propellers 11a to 11d attached to the motors 14, respectively.

As well shown in FIG. 2, the body part 13 according to the present embodiment has a substantially U-shape when viewed from the Z direction. That is, the right part 13R and the left part 13L extending along the Y direction and the connecting part 13C connecting the rear ends (end parts in the −Y direction) of the right part 13R and the left part 13L are provided.

With such a configuration, the body part 13 includes a surrounded space E surrounded by the right part 13R, the left part 13L, and the connecting part 13L. In the present embodiment, since the connecting part 13C is located at the rear end of each of the right part 13R and the left part 13L, the U-shape of the body part has a direction that opens forward.

The body part 13 may have, for example, a substantially C-shape, a substantially U-shape or a substantially channel-shape, as long as it has a direction that opens forward (details will be described later).

The auxiliary part 20 according to the present embodiment has an attachment part 21 and a rod-shaped frame 22. The attachment part 21 is fixed near the center of the frame 22.

The attachment part 21 has a shape that fits at least partially in the surrounded space E. As well shown in FIG. 1, the attachment part 21 is attached to the inside of at least the right part 13R and the left part 13L (side surface of the surrounded space side: attachment side surface). Various techniques can be applied to the attachment method.

A camera 23 is provided at the front end of the frame 22 so it is possible to photograph the front. The type of camera is not particularly limited, and can be appropriately selected depending on the purpose and application. Moreover, a gimbal may be mounted to the camera as needed.

As shown in FIG. 5 and FIG. 6, the flying body is in a state in which the airframe part 10 and the auxiliary part 20 are kept horizontal during hovering (FIG. 5 and FIG. 6).

Also, as shown in FIG. 7, the auxiliary part 20 contacts the ground during takeoff and landing. In addition, a separate leg part may be installed as needed.

Further, as shown in FIG. 8, when moving forward, a position of being tilted forward is obtained by increasing the output of the rear propeller.

Second Embodiment

As shown in FIGS. 9 and 10, the flying body according to the second embodiment of the present disclosure has an auxiliary part 20' structure that differs from the auxiliary part 20 according to the first embodiment described above. With respect to the other structures, the same structure as the flying body according to the first embodiment is applicable. In the following description, the same elements are denoted by the same reference numerals, and the description thereof is omitted.

Figure 9B:
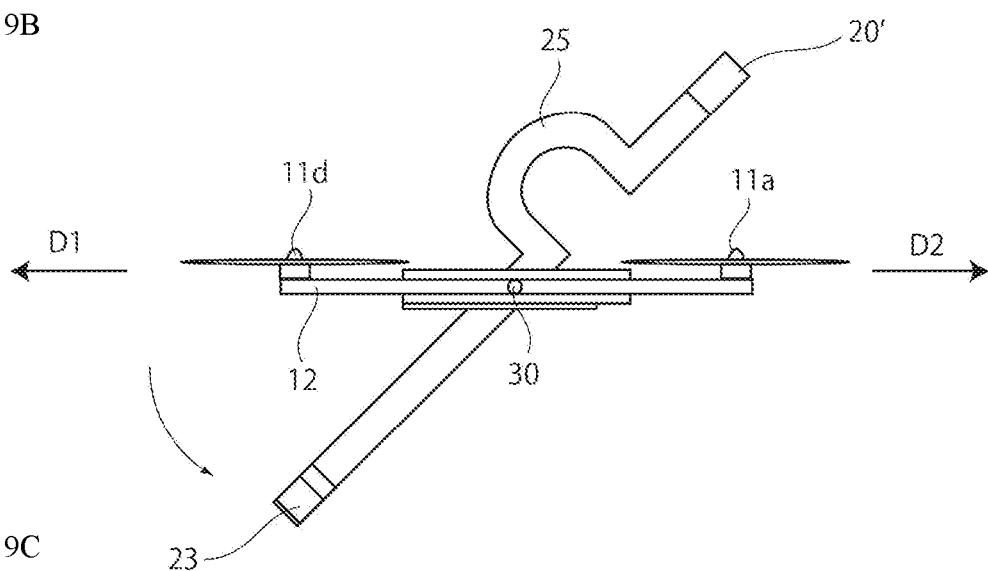
Figure 9C:
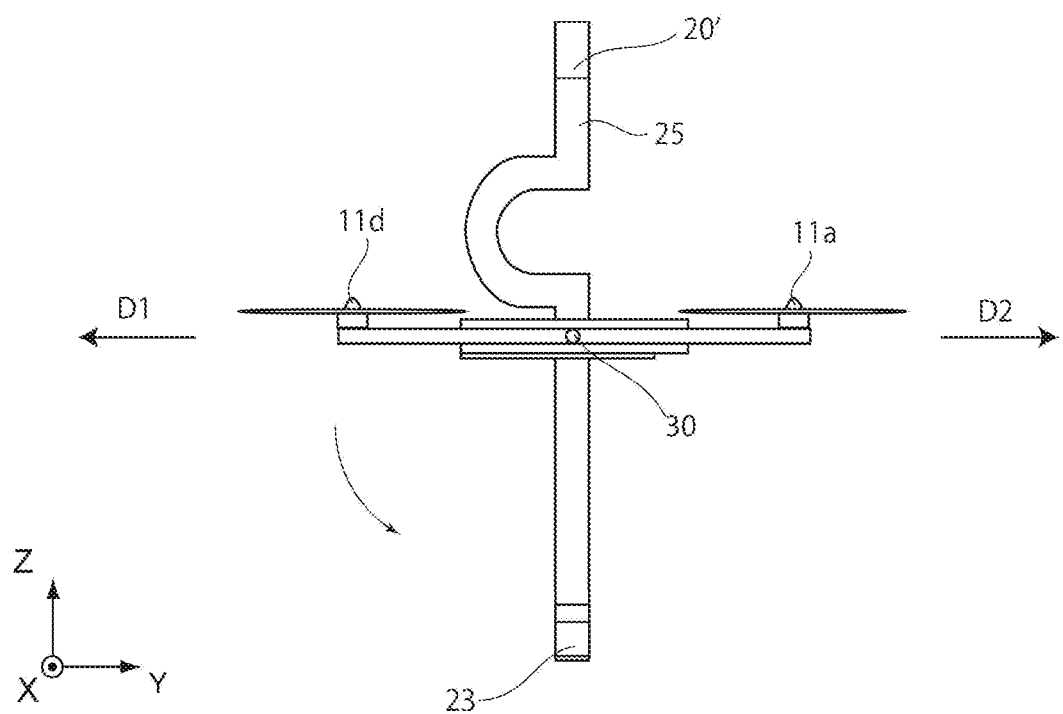

As shown in FIGS. 9A, 9B, and 9C, the auxiliary part 20' according to the present disclosure is connected to the body part 13 by a rotating shaft 30. With this structure, the auxiliary part 20' can rotate within a predetermined range about the rotating shaft 30 in the YZ plane.

As well shown in FIG. 9A and FIG. 10, the auxiliary part is partially located in the surrounded space E.

In particular, the auxiliary part 20' is formed with a substantially Ω-shaped relief part 25 when viewed along the X direction. With such a structure, even when a long auxiliary part 20' is used, the collision between the auxiliary part 20' and the body part 13 can be prevented by the relief part 25 straddling the connecting part 13C.

In addition, FIGS. 9A, 9B, and 9C and FIG. 10 has a relief part 25, but the relief part 25 may not be provided when a short auxiliary part is used.

The above-described flying body has, for example, a functional block as shown in FIG. 11. In addition, the functional block of FIG. 8 is a minimum reference structure.

A flight controller may have one or more processors, such as a programmable processor (e.g., a central processing unit (CPU)).

The flight controller has a memory (not shown) and it is possible to access the memory. The memory stores logic, codes, and/or program instructions that can be executed by the flight controller to perform one or more steps.

The memory may include, for example, a separable medium such as an SD card or random access memory (RAM) or an external storage device. Data obtained from cameras and sensors may be transmitted directly to the memory and stored. For example, still image dynamic image data taken by a camera or the like is recorded in a built-in memory or an external memory.

The flight controller includes a control module configured to control the state of the flying body. For example, the control module may control a propulsion mechanism (motor and the like) in order to adjust the spatial arrangement, velocity, and/or acceleration of the flying body having six degrees of freedom (translational motions x, y, and z, and rotational motions θx, θy, and θz). The control module can control one or more of the states of a mounted part and sensors.

The flight controller can communicate with a transceiver configured to send and/or receive data from one or more external devices (e.g., a terminal, display device, or other remote controller). The transceiver can use any suitable communication means such as wired or wireless communication, For example, the transceiver can use one or more of a local area network (LAN), a wide area network (WAN), infrared, wireless, WiFi, point-to-point (P2P) network, telecommunication network, cloud communication, and the like.

The transceiver can transmit and/or receive one or more of, data acquired by sensors, process results generated by the flight controller, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors e.g., cameras).

The flying body of the present disclosure can be expected to be used as an industrial flying body in research, surveying, observation and the like. In addition, the flying body of the present disclosure can be used in airplane-related industries such as multicopters and drones. Furthermore, the present invention can be suitably used as an aerial photography flying body equipped with a camera or the like. It can also be used in various industries such as security, agriculture, and infrastructure monitoring.

The above-described embodiments are merely examples for facilitating the understanding of the present invention, and are not intended to limit the present invention. It goes without saying that changes and improvements can be made to the present invention without departing from the gist thereof, and the equivalents thereof are included in the present invention.

DESCRIPTION OF REFERENCE NUMERALS 10 airframe part
11a to 11d propeller
12 arm
13 body part
13R right part
13L left part
13C connecting part
14 motor
20, 20' auxiliary part
21 attachment part
22 frame
23 camera
25 relief part
30 rotating shaft

The invention claimed is:

1. A flying body capable of traveling along at least a first direction, comprising an airframe part and an auxiliary part,
wherein the airframe part having a body part and a lift generating part,
wherein the body part has a right part and a left part extending along the first direction and a connecting part whereby the ends of the right part and the left part are connected in a second direction opposing to the first direction, and thus a surrounded space which is surrounded by the left part, the right part, and the connecting part is created when seen from a third direction perpendicular to the first direction,
wherein the surrounded space is open to the third direction,
wherein the auxiliary part is located at the surrounded space, and
wherein the body part holds the auxiliary part rotatably along a plane defined by the first direction and the third direction.

2. The flying body of claim 1,
wherein the body part has a substantially C-shape, a substantially U-shape or a substantially channel-shape when viewed from the third direction.

3. The flying body of claim 1,
wherein the auxiliary part is mounted to an attachment side surface of the surrounded space side on each of the right part and the left part of the body part.

4. The flying body of claim 3,
wherein the auxiliary part has a long side in the first direction.

5. The flying body of claim 4,
wherein the auxiliary part includes a substantially arch-shaped relief part provided so as to straddle the connecting part.

6. The flying body of claim 2,
wherein the auxiliary part is mounted to an attachment side surface of the surrounded space side on each of the right part and the left part of the body part.

7. The flying body of claim 6,
wherein the auxiliary part has a long side in the first direction.

8. The flying body of claim 7,
wherein the auxiliary part includes a substantially arch-shaped relief part provided so as to straddle the connecting part.

9. A flying body capable of traveling along at least a first direction, comprising an airframe part and an auxiliary part,
wherein the airframe part having a body part and a lift generating part,
wherein the body part has a right part and a left part extending along the first direction and a connecting part whereby the ends of the right part and the left part are connected in a second direction, and thus a surrounded space which is surrounded by the left part, the right part, and the connecting part is created when seen from a third direction perpendicular to the first direction, and
wherein the body part holds the auxiliary part rotatably along a plane defined by the first direction and the third direction.

* * * * *